United States Patent [19]
Sharpless

[11] 3,974,317
[45] Aug. 10, 1976

[54] THERMOMETRIC COMPOSITIONS INCLUDING INERT ADDITIVES AND PRODUCTS

[75] Inventor: Edward N. Sharpless, Somerville, N.J.

[73] Assignee: Ashley-Butler, Inc., Somerville, N.J.

[22] Filed: June 19, 1974

[21] Appl. No.: 480,672

Related U.S. Application Data
[63] Continuation-in-part of Ser. No. 375,873, July 2, 1973, abandoned.

[52] U.S. Cl. ............................ 428/215; 23/230 LC; 73/356; 252/299; 252/408; 428/1
[51] Int. Cl.² ................... C09K 3/34; G01K 11/12; G01N 31/22
[58] Field of Search ............................ 117/36.7, 1.7; 23/230 R, 230 LC; 73/356; 428/1, 215; 252/299, 408; 350/160 LC; 250/408 LC

[56] References Cited
UNITED STATES PATENTS
| | | | |
|---|---|---|---|
| 3,619,254 | 11/1971 | Davis | 117/72 |
| 3,795,529 | 3/1974 | Cartmell et al. | 117/1.7 |

*Primary Examiner*—Thomas J. Herbert, Jr.
*Attorney, Agent, or Firm*—Cooper, Dunham, Clark, Griffin & Moran

[57] ABSTRACT

Thermometric compositions for recording changes in temperature comprising a cholesteric liquid crystal system together with a chemically inert substance which is miscible with the crystal system. By varying the amount of the second component in the composition, the clearing point of the composition, that is the temperature at which there is a phase change to the isotropic phase, can be varied in a predictable manner.

13 Claims, 8 Drawing Figures

THERMOMETRIC COMPOSITIONS INCLUDING INERT ADDITIVES AND PRODUCTS

RELATED APPLICATION

This application is a continuation-in-part of U.S. application Ser. No. 375,873 filed July 2, 1973, now abandoned.

BACKGROUND OF THE INVENTION

Mesomorphic or "liquid crystalline" materials have long been known and have been classified into three types; smectic, nematic, and cholesteric. The cholesteric mesomorphic phase exhibits a number of optical properties which have attracted interest. One property is the scattering of white light, which property varies with temperature over a certain range, depending upon the particular cholesteric material.

This variable scattering of light is manifested as an apparent change in color of the cholesteric material and has been exploited for measuring transient changes in temperature occasioned by infrared radiation, microwave radiation, conduction, and convection. In this use the cholesteric material responds relatively rapidly so that a change in temperature quickly causes a change in the apparent color of the material.

Many attempts have been made to exploit these properties of liquid crystals and a large number of them have been successful.

One area which has attracted considerable attention is the possiblity of constructing thermometric elements such as clinical thermometers which record changes in temperature by visual changes in a plurality of liquid crystals systems, each of which responds to a different temperature, disposed in an orderly fashion on a suitable substrate. Despite major efforts, however, no suitable products have yet been developed.

One of the principal difficulties which has retarded the development of useful thermometric elements has been the necessity of forming a number of different liquid crystal systems each one of which changes in color at a different temperature. Research has advanced to the point where, with some difficulties, systems can be composed which will change color with great accuracy at a fixed temperature, for example at one-half degree intervals over the range from 96.5°F to 104.5°F — a suitable range for a clinical thermometer. To construct a thermometer capable of recording one-half degree increments in temperature over this range, it has heretofore been necessary to prepare seventeen different systems, each of which varies in the percentage composition of each component. This has caused great difficulties in compounding the compositions and in the cost of production. Additionally, the large number of different compositions involved has introduced significant changes of error.

Another problem has been stability of the products. Many devices which have been proposed are capable of accurately recording temperature changes when first prepared, but lose the ability after standing for an appreciable period of time.

No system has yet been devised which makes it possible to construct thermometric elements capable of recording numerous increments in temperature from one, single, basic composition in a facile and economic manner, accurately and without loss of stability. All systems which have heretofore been disclosed have required several changes in the ingredients or the percent composition of ingredients in the basic system in order to achieve the desired result.

THE INVENTION

It has now unexpectedly been discovered that thermometric compositions can be prepared which substantially alleviate the above discussed problems and make possible the construction of thermometric elements capable of accurately recording changes in temperature over a wide temperature range from one basic cholesteric liquid crystal system, and to maintain this accuracy for several months or even years. The thermometric compositions of this invention comprise:

a. a first cholesteric liquid crystal system characterized by exhibiting color in the cholesteric state at a first temperature in the focal conic or grandjean phase, and changing from that phase to a second isotropic phase exhibiting a different color at a second higher temperature, and b. a second component which is chemically inert with respect to the liquid crystal system and miscible with said system.

More specifically, each thermometric element of this invention comprises a plurality of separate compositions at least two of which have identical color on an inert base, each separate composition being suitable for recording changes in temperature by a visual change in color and comprising a mixture containing:

a. a first cholesteric liquid crystal system characterized by exhibiting color in the cholesteric state at a first temperature and changing from that state to a second state exhibiting a different color at a second fixed temperature, at least two such systems being identical in separate compositions, b. a second component other than (a) which is a chemically inert substance, miscible with said first system; the same second component, but differing percents by weight thereof; being utilized in each composition wherein said liquid crystal systems are identical, the differing amounts of said second component in each composition wherein the liquid crystal systems are identical being in a predetermined weight range wherein there is predictable variability in a curve in which the temperature at which said visual change in color takes place is plotted against percent by weight of said second component based on the total weight of said composition.

It has been discovered that it is possible to change the clearing point temperature, that is the phase transition temperature, of the liquid crystal system, and therefore of the thermometric composition in a predictable manner by varying the amount of the second component in the composition.

A cholesteric liquid system, as the term is used in this disclosure, refers to a system comprising one or more materials which exhibit a cholesteric phase separately or in combination. While the system may contain only one cholesteric liquid crystal compound, it will normally contain at least two and usually three such compounds.

Cholesteric liquid systems are capable of changing from one color to another, say yellow to red, with changing temperatures. They may also change from colored to colorless at a fixed temperature. The former color change is a fleeting change while the crystals remain in the same phase. The latter is an hysteretic change in which the crystal system undergoes an isotropic change and becomes colorless. On cooling, the system passes through a focal conic phase in which the system is somewhat grayish in appearance. This phase can be maintained for a rather extended period of time provided the system is protected from mechanical stress.

A special feature of the products of this invention is that all of the compositions in a particular product can have exactly the same color and exhibit exactly the same color change. This is an important advantage, since in prior art products different compositions have had different colors and different color changes. This has been a source of great difficulty, leading, for instance, to errors in reading clinical thermometers.

When used herein, the term "identical color" refers to colors which to the naked eye in white light appear to be the same. Slight differences, however, might appear if two or more liquid crystal systems were characterized with the aid of analytical instruments. It is a special feature of the products of this invention that over any given temperature range to be measured the color of at least two compositions will be identical. In most instances, all of the compositions will be identical in color. This is in sharp contrast to previously described thermometric elements, especially clinical thermometers where all of the compositions have been of clearly different colors or clearly different shades of the same color. This has led to confusion.

Of course, if a large temperature range is to be covered, it may be necessary or desirable to change the liquid crystal system, with the result that there may be two or more different colored systems in the same product, one to cover the lower end of the range, the other the upper end.

It has now been discovered that the clearing point of the same basic cholesteric liquid crystal system can be made to vary in a predictable manner by mixing with the system a substance which is miscible with it, and chemically inert towards it. Thus, for example, a system which without the additive clears at a fixed temperature will clear at a lower temperature when mixed with the specific additive. As more and more of the additive is mixed with the composition, the clearing point becomes progressively lower until the point where sufficient additive has been mixed with the system to destroy its liquid crystallinity with the result that the system no longer manifests cholesteric properties. Surprisingly, this change in clearing point with increasing amounts of additive is essentially linear over a rather wide range of temperature with most systems, so that a plot of clearing point temperature against percent by weight is a straight line with a descending slope over a wide range of temperatures. The preferred compositions within the scope of this invention are those in which there is such linearity.

The presently preferred additives for use in this invention are hydrocarbon fractions such as petrolatum. These materials are chemically inert, and miscible with liquid crystal systems. They are of sufficiently low volatility so that they do not evaporate during mixing or in storage. This is especially important where the compositions are to be used for measuring relatively high temperatures, as in chemical thermometers. For low temperature compositions, it is not so important. Especially preferred are mineral oil fractions having boiling points under atmospheric conditions of at least 150°F, and semisolid fractions such as petroleum jelly. These materials are readily available in highly purified form at reasonable cost.

While hydrocarbon fractions are preferred, a wide variety of other inert materials may also be employed. These include, for example, ethers, alcohols, esters, amines, ketones, nitro organic compounds and pyrroles. The principal characteristics of the additives which can be employed in this invention are that they are miscible with the liquid crystal system, and that they are chemically inert both with respect to the liquid crystal system and the environment.

As aforesaid, it is preferred to operate in the area of linearity. Thus, to cover an extremely wide range of temperatures, say from 0° to 300°F or even higher, it is preferred to prepare a limited number of systems and to vary their clearing points by the addition of additives within the range where the plot is linear. This is no disadvantage since only a limited number of compositions need be prepared in contrast to the large number previously required. For example, the temperature range from 90° to about 125°F can be covered with only two systems. A system containing 58.76% cholesteryl oleyl carbonate (OCC), 29.72% cholesteryl chloride (CC) and 11.52% cholesteryl-4-n-butoxy phenyl carbonate (nBPC) with up to 5.67% mineral oil will cover the temperature range from 96.5° to 125°F, and the system 71.23% OCC, 22.54% CC and 6.23% nBPC with up to 4.8% mineral oil will cover the range 90° to 116°F. With the former system the color change at the clearing points is from yellow – green to colorless, and with the latter system it is from green to colorless. The important point to note is that the composition of the liquid crystal system does not vary. Only the amount of inert additive varies.

In describing the systems herein, the percent of each component in the system is by weight based on the total weight of the system. The percent of the additive is by weight based on the total weight of the composition.

The process of this invention is applicable to a wide variety of liquid crystal systems. From the point of view of ready availability and economics, it is most useful with systems containing a cholesteryl halide, particularly the chloride, cholesteryl oleyl carbonate and an ester such as cholesteryl 4-n-butoxy phenyl carbonate or cholesteryl nonanoate. It is not however limited to these systems, and may be advantageously employed with many systems of which the following are illustrative.

68.8% Cholesteryl oleyl carbonate, 19.4% Cholesteryl chloride, 11.8% Sitosteryl p-n-pentyloxbenzoate — Clearing point 118.4°F 71.3% Cholesteryl oleyl carbonate, 19.9% Cholesteryl chloride, and 17.8% Sitosteryl 10-undecenoate — Clearing point 95.90°F 67.9% Cholesteryl oleyl carbonate, 19.3% Cholesteryl chloride, and 12.9% Sitosteryl octanoate — Clearing point 95.9°F 50.7% Cholesteryl oleyl carbonate, 20.7% Cholesteryl nonanoate, and 28.6% Sitosteryl acetate — Clearing point 93.2°F 50.7% Cholesteryl oleyl carbonate, 20.7% Cholesteryl nonanoate, and 28.6% Sitosteryl propionate — Clearing point 95.9°F 55.6% Sitosteryl Erucate, 22.2% Sitosteryl p-n pentyloxy benzoate, and 22.2% Cholesteryl Chloride — Clearing point 88.7°F 41.7% Sitosteryl Erucate, 41.7% Sitosteryl 3,4-dichorobenzate, and 16.6% Sitosteryl Chloride — Clearing point 71.6°F 59.2% Cholesteryl oleyl carbonate, 24.2% Cholesteryl nonanoate, and 16.6% Sitosteryl Chloride — Clearing point 96.8°F 50.7% Cholesteryl oleyl carbonate, 20.7% Cholesteryl nonanoate, and 28.6% Sitosteryl Chloride — Clearing point 100.40°F Cholesteryl oleyl carbonate, 71.23%, Cholesteryl chloride 22.54%, Cholesteryl 4-n-butoxy phenyl carbonate, 6.23% — Clearing point 114.97°F Cholesteryl oleyl carbonate, 58.65%, Cholesteryl Chloride, 29.93%, Cholesteryl 4-n-butoxy phenyl carbonate, 11.42%, — Clearing point 128.26°F Cholesteryl oleyl carbonate, 56.72%, Cholesteryl Chloride, 29.93%, Cholesteryl 4-n-butoxy phenyl carbonate, 11.65% — Clearing point 132.66°F Cholesteryl oleyl carbonate, 74.65%, Cholesteryl chloride, 18.74%, Cholesteryl laurate 6.60% — Clearing point 109.60°F The clearing points given are those of the systems without the additive, and are indicative of the ranges which can be achieved with suitable additives.

The compositions of this invention can be used to prepare a variety of thermometric elements suitable for recording changes in temperature by a visual color change by forming one or a plurality of separate layers of the compositions on a suitable substrate. The thickness of the layer of thermometric compositions used in this invention is generally from about 15 to 125 microns. It has been observed that if the thickness is appreciably above 125 microns the temperature response may be delayed. If the thickness is below 15 microns, it starts to approach the lattice dimensions of the crystals with the result that the clearing point temperature for a particular composition may be somewhat lower than the temperature of the same composition in a thicker layer or in bulk. This may introduce inaccuracies and difficulties in reproducibility.

The preferred thickness range is from 25 to 75 microns. It has been observed that at a thickness of 25 microns the transition temperature, or clearing point temperature, of the compositions within the scope of the invention more closely correlate with the transition temperature of the same materials in bulk form. With most compositions, it is possible to combine the features of convenience and economy of preparation without increasing the thickness of the layer above 75 microns.

Figure 3:
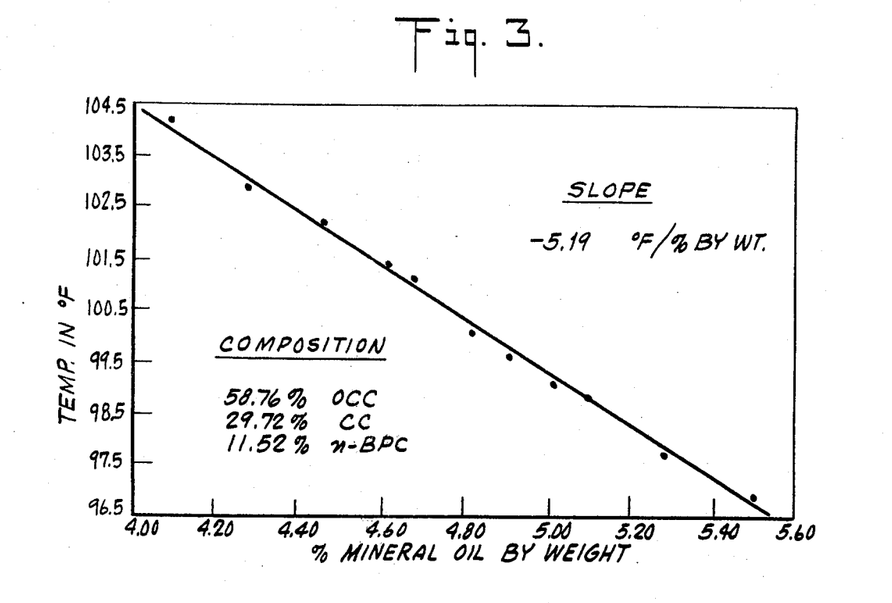
Figure 4:
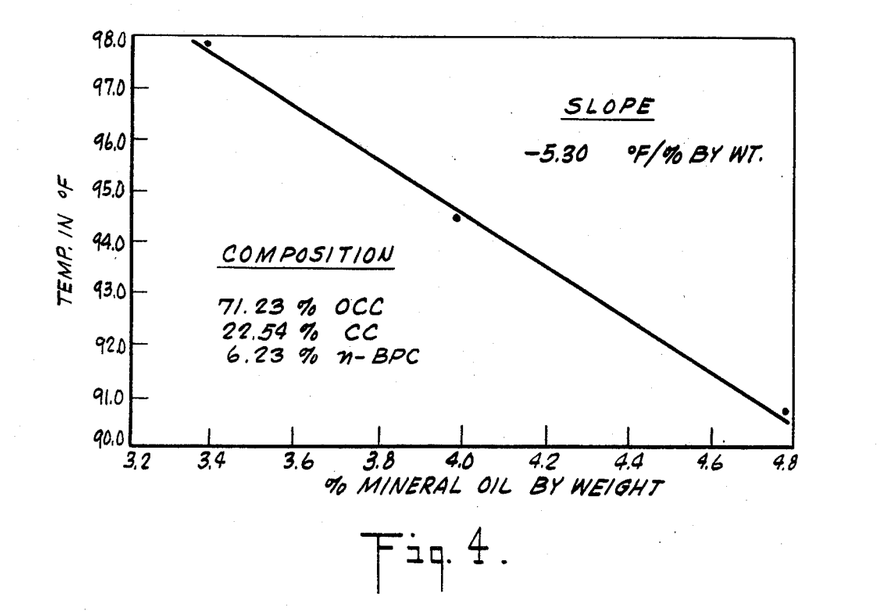
Figure 5:
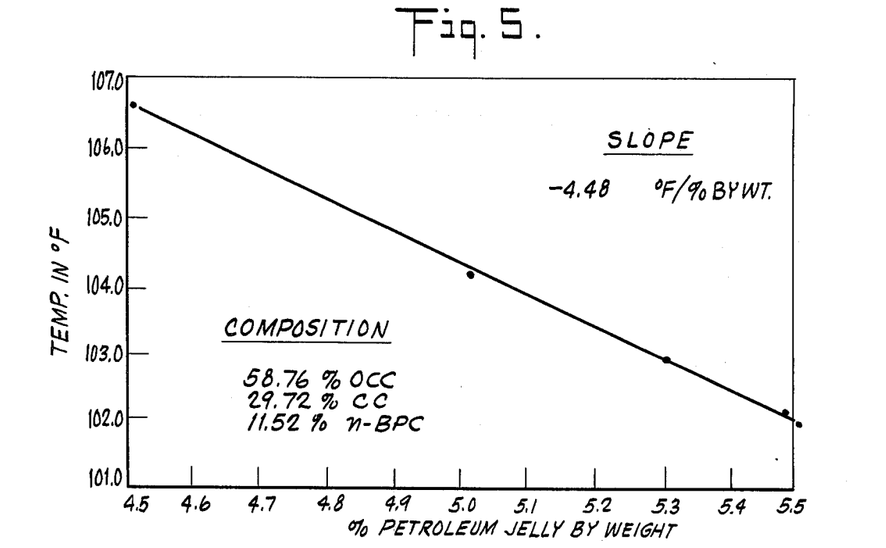
Figure 6:
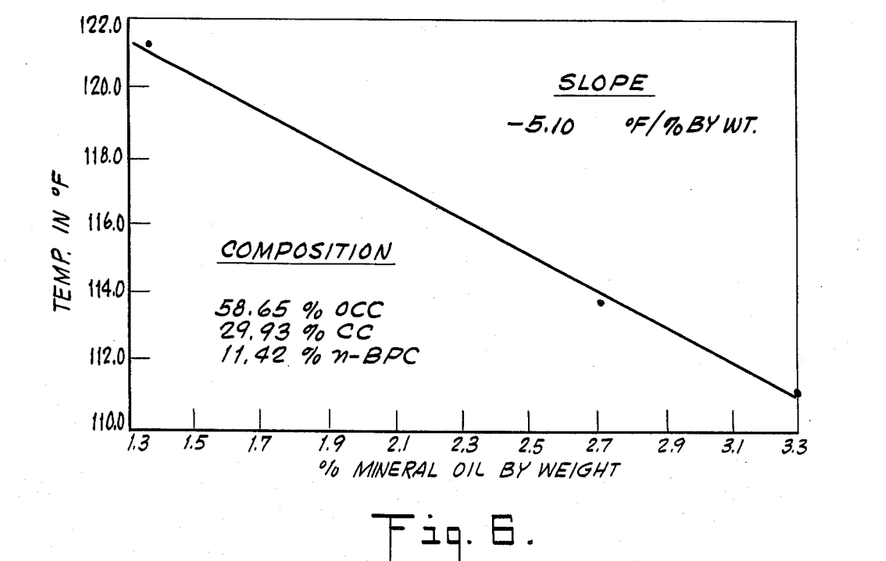
Figure 7:
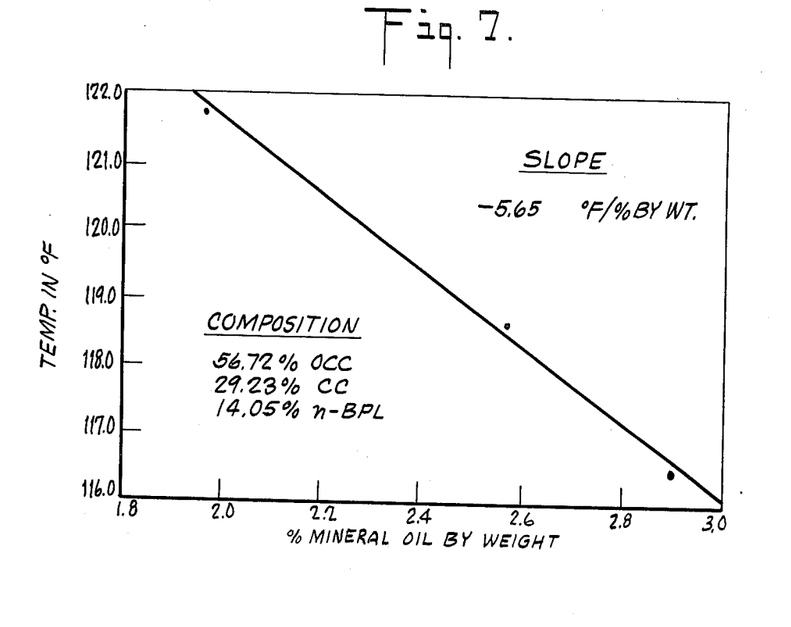
Figure 8:
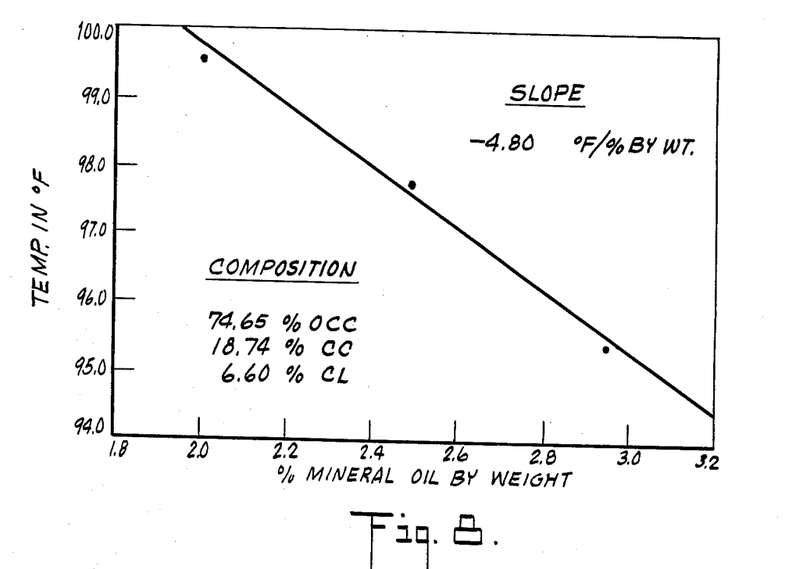

Products containing the compositions of this invention because they are hysteretic have especial utility in recording the highest temperature to which an object has been exposed or which exists in the object. Thus, the thermometric element can be utilized in maximum-temperature thermometers, especially in clinical thermometers. The range for the transition temperature would be chosen to be between the normal oral or other temperature to be measured and the highest temperature to which sensitivity is desired. For instance, a clinical thermometer can be prepared from the composition of FIG. 3 which is an especially preferred composition of the invention. Such a thermometer could be inserted in the patient's mouth for a short period of time, removed and read.

Because of the great utility and advantages of such thermometric articles, or thermometers, they are described in greater detail with reference to the accompanying drawings, wherein.

Figure 1:
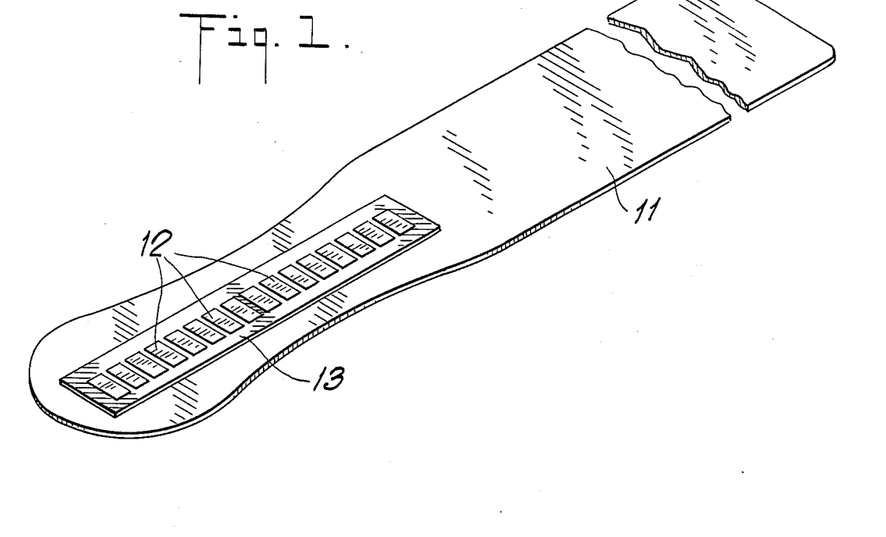
FIG. 1 is a view of the thermometer prepared according to the present invention.

FIG. 1 shows a simple thermometric article comprising a substrate or base 11 which is chemically and physically inert and non-absorbent with respect to the thermometric composition. On substrate 11 is coated an array of different cholesteric compositions 12 according to this invention. The cholesteric compositions are overcoated with a thin film of material 13 to prevent contamination of the composition by dust, fluids, vapors, and the like. While the cholesteric compositions 12 are shown as rectangular areas in FIG. 1, it will be appreciated that the configuration of the area can be any plane geometric figure.

It may be desirable to coat the thermometric compositions onto a substrate in the form of numerals or letters which can either directly be read to obtain the temperature or which can be read by means of a code. In clinical use, for example, it may be desirable that the thermometric articles indicate temperature in terms of a set of code letters so that the patients will not be alarmed by knowledge that their temperatures are abnormal.

Figure 2:
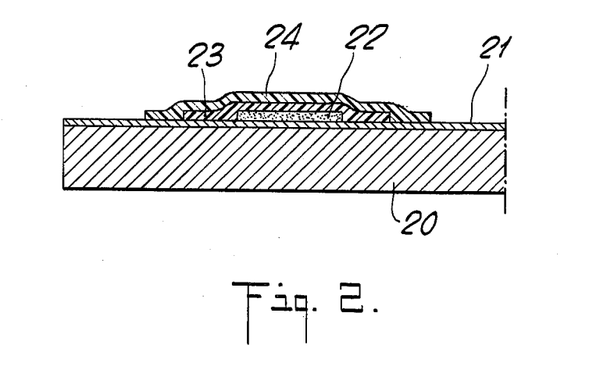
FIG. 2 is a sectional view of another thermometric article so prepared.

FIG. 2 shows a second embodiment of the invention which provides relatively inexpensive disposable clinical thermometers. Here, the base or substrate 20 is a piece of black paperboard stock which is coated with a thin layer of polyethylene or other thin protective film 21 to protect the paper from the thermometric composition 22 coated thereon. The thermometric composition 22 is then overcoated with a layer of immiscible material 23 such as casein glue, polyvinyl alcohol, and the like. Where the thermometric article is to be utilized in an aqueous or humid environment it may be desirable to provide a second overcoating 24 of water-insoluble material such as polyethylene, methacrylate, and the like.

It will be appreciated by those skilled in the art that the base upon which the thermometric composition is coated can be any solid material. If the material would tend to absorb or to adversely affect the thermometric composition, it can first be coated with a thin film of an inert material as described above. The coating or coatings covering the thermometric composition must of course be sufficiently transparent or translucent in the thin layers used that the color change can be visually detected, unless substrate 11 is itself transparent. For optimum inspection of the phase change, the substrate or any coating 21 directly under the thermometric composition should be a dark color, and is preferably black to absorb light directly incident thereon and permit more facile observation of the light scattered from the cholesteric substance.

The substrate could consist of a wide variety of substances including rigid or semi-rigid materials like cellulose acetate, cellulose acetate butyrate, polyvinyl chloride, polyesters, polyethylene, paper, polyvinyl alcohol coated paper, lacquer coated paper, polyvinyl alcohol film, glass, saran, and the like.

The top coat could consist of the same substances as the substrate but could also include materials added over the substrate and composition in the manner described in U.S. Pat. NO. 3,619,254.

The cholesteric composition is preferably deposited on the substrate or substrate and base combination as a thin film or layer. It will be appreciated from the present description that the cholesteric composition can be placed in a square, rectangular, other polygonal, round, elliptical, or other geometric figure such as numerals, letters, symbols and the like, depending upon the type of thermosensing device required. For example, a composition, which would leave the cholesteric state and cease to disperse light as the temperature was raised, could be deposited on the substrate in a pattern In the Figures:
OCC is cholesteryl oleyl carbonate,
CC is cholesteryl chloride,
nBPC is cholesteryl 4-n-butoxy phenyl carbonate, and
CL is cholesteryl laurate.

EXAMPLES 9 – 32

Table I records the results observed with a variety of chemically inert additives with different liquid crystal compositions.

TABLE I

| EXAMPLE | ADDITIVE | CLASS | SLOPE* | RANGE, °F | ADDED | L.C. | METHOD |
|---|---|---|---|---|---|---|---|
| 9 | p-Nitrophenylphenyl ether | Ether | −4.98 | 128.66– 92.39 | 0–7.14 | C | II |
| 10 | Dodecyl alcohol | Alcohol | −5.16 | 129.56– 93.20 | 0–7.10 | A | II |
| 11 | Dodecyl alcohol | Alcohol | −4.84 | 111.38– 88.97 | 0–4.65 | D | II |
| 12 | Dodecyl alcohol | Alcohol | −5.45 | 143.6 – 91.9 | 0–8.08 | E | II |
| 13 | Di (2-Ethylhexyl) maleate | Ester | −5.86 | 128.66– 95.45 | 0–4.85 | C | I |
| 14 | Di (2-Ethylhexyl) maleate | Ester | −5.81 | 111.38– 83.30 | 0–4.74 | D | II |
| 15 | Di (2-Ethylhexyl) maleate | Ester | −6.89 | 143.6 – 87.2 | 0–8.22 | E | II |
| 16 | Tri-n-octylamine | Amine | −6.04 | 128.66– 88.61 | 0–6.53 | C | II |
| 17 | Diethyl phthalate | Ester | −6.33 | 127.49– 84.06 | 0–6.18 | B | I |
| 18 | Hexyl ether | Ether | −6.67 | 128.66– 90.50 | 0–5.60 | C | II |
| 19 | Butoxy ethyl ether | Ether | −7.11 | 128.66– 93.02 | 0–4.95 | C | II |
| 20 | Nitrobenzene | Nitro | −7.03 | 128.66– 97.88 | 0–4.81 | C | II |
| 21 | Phenyl ether | Ether | −7.39 | 129.56– 99.32 | 0–4.08 | A | II |
| 22 | Phenyl ether | Ether | −6.92 | 111.38– 88.61 | 0–3.32 | D | II |
| 23 | Phenyl ether | Ether | −8.21 | 150.71– 96.08 | 0–6.65 | F | II |
| 24 | Acetophenone | Ketone | −7.78 | 129.56– 95.00 | 0–5.06 | A | II |
| 25 | 2-Ethylhexanol | Alcohol | −7.81 | 129.56– 89.69 | 0–5.08 | A | II |
| 26 | Cyclohexanone | Ketone | −8.00 | 129.56– 100.13 | 0–4.03 | A | II |
| 27 | Bis (2-mexhoxy methyl) ether | Ether | −8.50 | 129.56– 108.68 | 0–3.04 | A | II |
| 28 | N-Methyl pyrrole | Pyrrole | −9.46 | 129.56– 98.33 | 0–4.05 | A | II |
| 29 | N-Methyl pyrrole | Pyrrole | −7.94 | 111.38– 87.08 | 0–3.27 | D | II |
| 30 | N-Methyl pyrrole | Pyrrole | −8.54 | 150.71– 89.24 | 0–6.98 | F | II |
| 31 | 9-Heptadecanone | Ketone | −9.55 | 128.66– 95.09 | 0–6.87 | C | II |
| 32 | N, N-Diethylaniline | Amine | −9.66 | 129.56– 88.16 | 0–4.63 | A | II |

*SLOPE = °F/1% By Weight of Additive to Liquid Crystal Formulation of the letters "SAFE" so that the failure of the letters to be apparent would indicate that the article is overheated.

The cholesteric composition can be applied to the substrate in any convenient manner. For example, the composition can be coated or deposited on the substrate by silk screening, letterpress, printing, lithography, offset, spraying, pouring, brushing, with a doctor blade and/or roller mill, or by other conventional methods.

It will be appreciated from this description that electronic devices, printed circuit boards, light fixtures, electrical wiring, and other artifacts which are either temperature sensitive, or the failure of which produces a temperature rise, can similarly be monitored.

A particularly useful embodiment of the invention is one in which the compositions are arrayed on a flexible substrate backed with adhesive. The product can be affixed to the human body, for example a patient's forehead and the temperature monitored without disturbing the patient. In this case, the substrate should be a good heat conductor such as a foil of plastic coated aluminum. For ease of reading, the aluminum should be darkened as by anodizing or painting. Instead of backing the substrate with an adhesive, the monitoring device can be held in place with adhesive tape.

The compositions of this invention and their thermometric properties are illustrated by FIGS. 3–8 which are provided as non-limiting examples of this invention. The compositions illustrated in the figures were prepared by simple mixing and stirring. Temperatures were measured with Hewlett-Packard Model 2801 quartz thermometer.

EXPLANATION OF TABLE

I. LIQUID CRYSTAL — The liquid crystal formulations utilized are designated here. The abbreviations represent the cholesterol derivatives as follows:
OCC = Cholesteryl Oleyl Carbonate; CC = Cholesteryl Chloride;
nBPC = Cholesteryl 4-n-Butoxyphenyl Carbonate.

| A. 58.72% OCC | B. 58.77% OCC |
|---|---|
| 29.77% CC | 29.71% CC |
| 11.51% nBPC | 11.52% nBPC |
| C. 58.80% OCC | D. 74.50% OCC |
| 29.67% CC | 21.70% CC |
| 11.52% nBPC | 3.80% nBPC |
| E. 45.83% OCC | F. 45.30 % OCC |
| 38.20% CC | 34.69% CC |
| 15.97% nBPC | 20.01% nBPC |

II. METHOD OF SAMPLE PREPARATION — Two methods were utilized to prepare liquid crystal samples for measurement of phase transition.

Method I. One method utilized was to silk screen about a one mil sample onto a clean glass slide.

Method II. A second method utilized, and found to give very reproducible results, was to place a droplet of liquid crystal of about 3mm diameter onto a glass slide, then drop a cover slip onto the droplet and press the cover slip with the clean end of a spatula thus spreading the droplet into a large, circular area of about 15mm.

III. METHOD OF MEASURING TRANSITION TEMPERATURE — The prepared sample is placed into a Mettler Microfurnace mounted on the stage of a polarizing microscope utilizing an epitype illuminator for one full minute to allow the glass slide and liquid crystal to equilibrate to the microfurnace temperature. The temperature is then elevated at a rate of 1°C per minute until the transition is observed. The temperature at which the sample is placed into the microfurnace is about 2°C below the transition temperature. (The transition temperature is approximately determined by placing a sample into the microfurnace and rapidly raising the temperature. A sample for accurate measurement at a slow rate of increasing temperature is then placed into the microfurnace.)

IV. TEMPERATURE RANGE OF TEST — The temperature range of the additives did not exceed about 151°F, and did not fall below about 83°F.

V. ADDITIVES THAT PRODUCED LINEAR PLOTS — A total of 16 different chemically inert, miscible additives demonstrated linear plots, comprising six different general chemical classes, according to functional groups, but not including variables within the classes such as aromatic, cyclic, linear, branched-chain, or heterocyclic structures. These additives were soluble at least inside the temperature range of the tests.

EXAMPLES 33 – 49

Table II records the results of tests in which other chemically inert additives, principally hydrocarbons were employed.

CN = Cholesteryl Nonanoate
CM = Cholesteryl Myristate
CBr = Cholesteryl Bromide

ADDITIVES — A number of different additives are reported in the Table. An explanation of the type and/or source of each is here given.

1. Mineral Oil — Off-the-shelf drug store stock material under the label of E. R. Squibb & Sons, Inc. of Princeton, N.J.
2. Vaseline — Trademarked product under the label of Cheesebrough-Ponds, Inc. of New York, N.Y. Sublabeled as "pure petroleum jelly." This is an off-the-shelf drug store stock item.
3. Fluorolube S-30 — This additive is a product of Hooker Chemical Corporation of Niagara Falls, N.Y. It is a polymer of trifluorovinyl chloride. It exists as a water-white liquid with a viscosity of 190 centipoise at 100°F. This additive is also known as a polymonochlorotrifluoro ethylene.
4. Chlorinated Paraffin — A product of Pearsall Chemical Corporation of Phillipsburg, N.J. It is a mixture of normal and branched-chain hydrocarbons containing 19 to 22 carbon atoms and chlorinated 41–43 percent by weight.
5. Polyisobutylene — This additive is a product of The Lubrizol Corporation of Cleveland, Ohio. It is sold under the name LUBRIZOL 3140 (SS No. 32505) and

TABLE II

RESPONSE OF VARIOUS LIQUID CRYSTAL SYSTEMS TO SIMILAR ADDITIVES

| EXAMPLE | ADDITIVE | SLOPE | LIQUID CRYSTAL | | | RANGE, °F | % ADDED | METHOD |
|---|---|---|---|---|---|---|---|---|
| 33 | Mineral Oil | −5.55 | 55.66% OCC; | 30.59% CC; | 13.44% nBPC | 132.49–70.66 | 0–12.60 | III |
| 34 | Mineral Oil | −5.28 | 58.76% OCC; | 29.72% CC; | 11.52% nBPC | 127.83–70.97 | 0–10.28 | III |
| 35 | Mineral Oil | −5.33 | 54.99% OCC; | 20.00% CL; | 25.00% CC | 122.88–77.84 | 0– 8.68 | III |
| 36 | Mineral Oil | −5.25 | 54.84% OCC; | 24.56% CC; | 20.60% CN | 121.45–81.00 | 0– 7.76 | III |
| 37 | Mineral Oil | −4.84 | 52.20% OCC; | 23.87% CC; | 23.93% CM | 124.62–82.22 | 0– 8.83 | III |
| 38 | Mineral Oil | −5.83 | 58.08% CO; | 31.09% CC; | 10.83 nBPC | 135.76–84.34 | 0– 8.76 | III |
| 39 | Mineral Oil | −5.67 | 58.82% OCC; | 29.68% CBr; | 11.50% nBPC | 127.99–88.27 | 0– 6.99 | III |
| 40 | Vaseline | −4.13 | 58.76% OCC; | 29.72% OCC; | 11.52% nBPC | 127.84–75.44 | 0–12.79 | III |
| 41 | Vaseline | −4.32 | 55.66% OCC; | 30.57% CC; | 13.76% nBPC | 132.67–78.11 | 0–12.74 | III |
| 42 | Vaseline | −3.89 | 54.99% OCC; | 25.00% CC; | 20.00% CL | 122.88–75.52 | 0–12.16 | III |
| 43 | Vaseline | −3.96 | 54.84% OCC; | 24.56% CC; | 20.60% CN | 121.45–80.23 | 0–10.37 | III |
| 44 | Vaseline | −3.97 | 52.20% OCC; | 23.87% CC; | 23.93% CM | 124.62–83.91 | 0–10.42 | III |
| 45 | Vaseline | −4.42 | 58.08% CO; | 31.09% CC; | 10.83% nBPC | 135.76–85.99 | 0–11.27 | III |
| 46 | Fluorolube S-30 | −1.55 | 58.48% OCC; | 29.92% CC; | 11.60% nBPC | 127.76–116.40 | 0– 7.43 | III |
| 47 | Fluorolube S-30 | −1.38 | 58.82% OCC; | 29.68% CBr; | 11.50% nBPC | 127.99–102.16 | 0–16.32 | III |
| 48 | Chlorinated Paraffin | −4.95 | 58.48% OCC; | 29.92% CC; | 11.60% nPBC | 127.76–83.75 | 0– 9.49 | III |
| 49 | Polyisobutylene | −4.20 | 58.77% OCC; | 29.71% CC; | 11.52% nBPC | 127.68–80.26 | 0–11.29 | III |

EXPLANATION OF TABLE

SLOPE — The slope is a measure in degrees fahrenheit per 1 weight percent additive to the liquid crystal.

METHOD — The experimental method utilized with these additives was to silk screen about a 1 mil (25 microns) thick layer of the liquid crystal composition onto a 10 mil (250 micron) thick piece of black vinyl (as a substrate), then immerse the liquid crystalladen vinyl strip into a water bath in which a quartz thermometer probe is fixed. The water temperature is then increased until the liquid crystal-isotropic transition is observed with the temperature of the transition recorded by the operator.

LIQUID CRYSTALS — Various abbreviations used for cholesteric liquid crystals in the table are:

OCC = Cholesteryl Oleyl Carbonate
CC = Cholesteryl Chloride
nBPC = Cholesteryl 4-n-Butoxy Phenyl Carbonate
CL = Cholesteryl Laurate
C2,4D = Cholesteryl 2,4-Dichlorobenzoate is utilized in the automotive lubrication industry as a Viscosity Index improver.

What is claimed is:

1. A thermometric element comprising a plurality of separate compositions at least two of which have identical color arrayed in layers on an inert base, each layer from 15 to 125 microns in thickness, each separate composition being suitable for recording changes in temperature by a visual change in color and comprising a mixture containing:
    a. a first cholesteric liquid crystal system characterized by exhibiting color in the cholesteric state at a first temperature and changing from that state to a second isotropic state exhibiting a different color at a second fixed temperature, at least two such systems being identical in separate compositions,
    b. a second component other than (a) which is a chemically inert substance, miscible with said first system; the same second component but differing percents by weight thereof; being utilized in each composition wherein said liquid crystal systems are identical, the differing amounts of said second component in each composition wherein the liquid crystal systems are identical being in a predetermined weight range wherein there is predictable variability in a curve in which the temperature at which said visual change in color takes place is plotted against percent by weight of said second component based on the total weight of said composition.

2. A thermometric element of claim 1 wherein said curve is linear.

3. A thermometric element of claim 1 wherein the second component is petrolatum.

4. A thermometric element of claim 3 wherein the second component is mineral oil.

5. A thermometric element of claim 3 wherein the second component is petroleum jelly.

6. A thermometric element of claim 1 wherein the cholesteric liquid crystal system contains cholesteryl oleyl carbonate and a cholesteryl halide.

7. A thermometric element of claim 6 wherein the cholesteryl halide is cholesteryl chloride.

8. A thermometric element of claim 6 additionally containing cholesteryl-4-n-butoxy phenyl carbonate in the liquid crystal system.

9. A thermometric element of claim 2 wherein the liquid crystal system consisting essentially of by weight based on the total weight of said system
  58.76% Cholesteryl oleyl carbonate
  29.72% Cholesteryl chloride
  11.52% Cholesteryl-4-n-butoxy phenyl carbonate
and from 4% to 5.6% by weight of mineral oil, based on the total weight of the composition.

10. A thermometric element of claim 1 wherein each layer has a thickness of from 25 to 75 microns.

11. A thermometric element of claim 1 which is a clinical thermometer.

12. A thermometric element of claim 11 coated with a thin protective film.

13. A thermometric element of claim 2 wherein the liquid crystal system consisting essentially of by weight based on the total weight of said system
  74.88% Cholesteryl oleyl carbonate
  21.78% Cholesteryl chloride
  3.33% Cholesteryl-4-n-butoxy phenyl carbonate
and from 1% to 2.8% by weight of mineral oil based on the total weight of the composition.

* * * * *